United States Patent [19]

Aschoff et al.

[11] Patent Number: 4,517,502
[45] Date of Patent: May 14, 1985

[54] LOAD MONITORING CIRCUIT FOR ELECTRIC MOTORS

[75] Inventors: Hans-Joachim Aschoff, Wuppertal; Lothar Cholewa, Herne, both of Fed. Rep. of Germany

[73] Assignee: Vorwerk & Co. Interholding GmbH, Wuppertal, Fed. Rep. of Germany

[21] Appl. No.: 594,773

[22] Filed: Mar. 26, 1984

[30] Foreign Application Priority Data

Mar. 31, 1983 [DE] Fed. Rep. of Germany ....... 3311771

[51] Int. Cl.³ .............................................. H02P 1/18
[52] U.S. Cl. .................................... 318/474; 318/334; 318/430; 318/445
[58] Field of Search .............. 318/334, 345 C, 345 D, 318/430, 431, 432, 433, 434, 445, 474, 476

[56] References Cited

U.S. PATENT DOCUMENTS

| | | | |
|---|---|---|---|
| 3,373,330 | 3/1968 | O'Brien | 318/432 X |
| 3,445,725 | 5/1969 | Molen | 318/476 X |
| 4,103,317 | 7/1978 | Krick | 318/474 X |
| 4,195,254 | 3/1980 | Gurwicz et al. | 318/334 |
| 4,220,900 | 9/1980 | Mintz | 318/476 X |
| 4,288,828 | 9/1981 | Kuntner | 318/430 X |

FOREIGN PATENT DOCUMENTS

| | | | |
|---|---|---|---|
| 52-22715 | 2/1977 | Japan | 318/474 |
| 54-161042 | 12/1979 | Japan | 318/434 |
| 2067370 | 7/1981 | United Kingdom | 318/430 |
| 0656169 | 4/1979 | U.S.S.R. | 318/432 |

OTHER PUBLICATIONS

Conference paper, 1977 Electrical & Electronics Engrs. Tenth Convention, Tel Aviv, Israel (Oct. 10-13, 1977), pp. 97-99.

Primary Examiner—B. Dobeck
Assistant Examiner—Bentsu Ro
Attorney, Agent, or Firm—Michael J. Striker

[57] ABSTRACT

Disclosed is a monitoring circuit responding to different operational conditions of an electric motor. The circuit includes a measuring resistor connected in series with the stator winding of the motor to produce an actual load value signal. The actual value signal is applied to one input of a comparison circuit whose other input is consecutively supplied with three different nominal reference voltages corresponding to principle operational conditions of the motor, namely to the starting phase, to the normal operational phase, and to an overload. The source of the variable reference voltage includes switching transistor cooperating with a timing member and with voltage dividers adjustable from zero to a maximum nominal voltage value corresponding to the power supply voltage.

6 Claims, 1 Drawing Figure

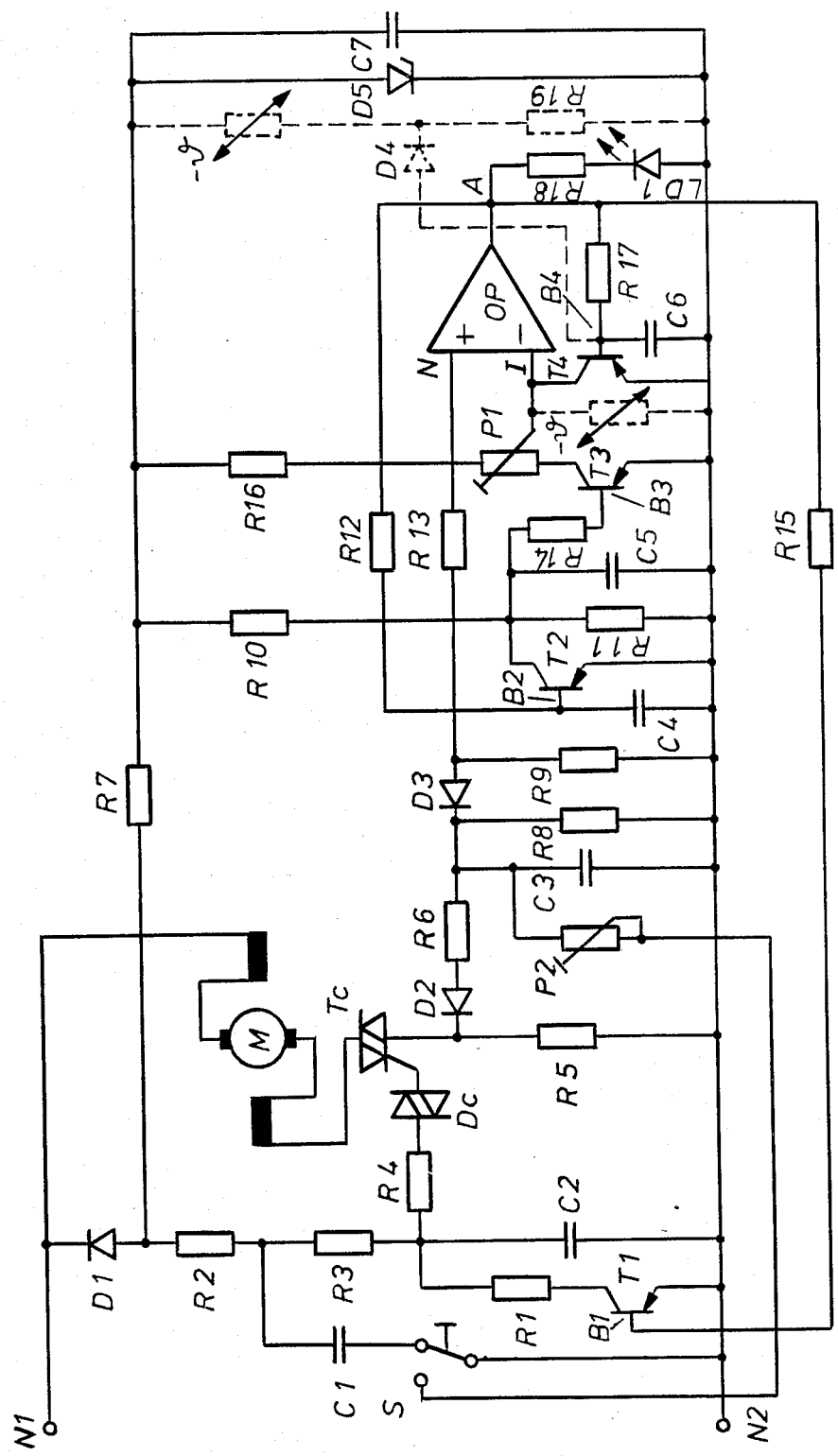

LOAD MONITORING CIRCUIT FOR ELECTRIC MOTORS

BACKGROUND OF THE INVENTION

The present invention relates to a monioring circuit for supervising different operational conditions of an electric motor and in particular it relates to a monitoring circuit of the type which employs a measuring resistance connected in series with the stator winding of the electric motor to produce a voltage drop which is proportional to the electric currrent flowing through the motor.

Monitoring circuits of this kind are known and find practical use for example in a vacuum cleaner so as to monitor load of the driving electric motor and disconnect the same when an overload occurs. In this case, the electric motor is controlled via a thyristor and the measuring resistance is connected in the thyristor circuit to provide a voltage which is proportional to the motor current. This actual value voltage is applied via a timing RC member to a voltage dividing potentiometer which in turn is connected to the base of a transistor. This transistor is connected parallel to the thyristor circuit. The voltage dividing potentiometer adjusts the actual value voltage to such a value that during normal operational conditions of the motor the transistor is not yet switched on. Only when the motor current increases due to an overload, then the actual value voltage across the measuring resistor increases accordingly and so does the voltage on the base of the transistor. As a consequence, the transistor switches on, blocks the thyristor and the electric motor is stopped. At the same time, another transistor is switched on to apply via a feedback conduit a signal to the base of the first-mentioned transistor so as to keep it in the switched on state. Hence, the entire control circuit is brought in a self-restraining condition. The driving motor can be restarted only by disconnecting and reconnecting supply voltage from the main. During the start of the electric motor when as known a momentary high current flows through the stator winding and consequently a high voltage drop appears across the measuring resistor, the aforementioned RC member prevents the first transistor from immediately disconnecting the electric motor. In this prior art arrangement the setting of the nominal value by the voltage dividing potentiometer is extremely critical inasmuch as the RC member simultaneously generates during the start of the motor a certain voltage across the voltage dividing potentiometer. Accordingly, the desired threshold value cannot be adjusted to any arbitrary magnitude because in the case of low threshold values reached during the starting operation are in the order of the voltage across the RC member, the transistor is switched on and restarts the motor. Therefore, the magnitude of the adjusted threshold value must be sufficiently large to be above the voltage value across the RC member. This limitation in prior art monitoring circuits is considerable disadvantageous.

SUMMARY OF THE INVENTION

It is therefore a general object of the present invention to overcome the aforementioned disadvantage.

More particularly, it is an object of the invention to provide an improved load monitoring circuit of the aforedescribed kind in which the setting of individual threshold reference values for the starting load and for the disconnection of the motor in the case of overload is made possible from zero to a maximum value.

A further object of this invention is to provide such an improved monitoring circuit which is relatively simple and can be produced at low cost.

In keeping with these objects and others which will become apparent hereafter, one feature of the invention resides, in a load monitoring circuit for electric motors, in a combination which comprises a measuring resistor connected in series with the stator winding of the motor to produce an actual load value signal, an adjustable reference voltage source, a comparison circuit having one input coupled to the measuring resistance, a second input coupled to the variable reference voltage source and an output and means for automatically adjusting from zero to a maximum value the adjustable source of reference voltage to at least three main operational conditions of the electric motor, namely to a starting load operational condition, a normal load operational condition, and a overload operational condition.

Preferably the comparison circuit is in the form of an operational amplifier whose inverting input is connected to an adjustable voltage divider controlled by a switching transistor whose base is coupled to a RC circuit which delays the switching on of the transistor during the starting phase of the motor, thus setting a maximum reference or nominal value which cannot be tresspassed by the actual load value during the starting phase. At the beginning of the normal operation of the motor the transistor is automatically switched on and produces at the inverting input of the operational amplifier a reference value corresponding to the normal operational load. When this normal value is tresspassed due to an overload, a signal derived from the output of the operational amplifier is fed back to the voltage source to adjust the same to a zero reference voltage and to retain this condition. At the same time, a stop signal is fed back to the control circuit for the driving motor so that the latter is stopped. It can be restarted only after disconnection from the main power supply.

It is evident that the invention has the substantial advantage residing in the fact that the reference or threshold value for disconnecting the motor can be adjusted without regard to the voltage which is developed across the timing RC member actuated during the starting phase of the electric motor, and at the same time, any manual adjustment of the reference threshold value for the starting operation can be dispensed with.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates a circuit diagram of an exemplary embodiment of a motor load monitoring circuit according to this invention.

DESCRIPTION OF THE PREFERRED EMBODIMENT

An eletric motor M to be monitored has its stator windings connected to terminals N 1 and N 2 of a supply line via a control triac TC whose gate is controlled by a diac DC and a series connected measuring resistor R 5. Accordingly, voltage drop across the resistor R 5 is proportional to momentary current flowing through the electric motor.

This voltage drop which is the measure of the actual motor load is rectified in a diode D 2 and integrated in an integrating circuit R 6, C 3. Voltage across the integrating capacitor C 3 indicates the actual value of the momentary current and this actual value signal is applied via a decoupling diode D 3 and a series connected resistor R 13 to a noninverting input N of an operational amplifier OP which is connected as a voltage comparison circuit. Nominal reference voltage values generated in an adjustable reference voltage source which will be described in greater detail below, are applied to the inverting (minus) input of the amplifier OP. The nominal reference voltage value, according to one feature of this invention, successively and automatically is adjusted to different magnitudes which correspond to the momentary operational condition of the electric motor.

In starting the electric motor M, relatively high starting current is developed which normally would trigger a monitoring circuit adjusted for a normal operating load. In order to avoid this premature safeguard, the first or starting nominal reference value is derived from the motor supply voltage stabilized by a Zener diode D 5. This stabilized supply voltage is applied to a voltage divider consisting of resistors R 16 and potentiometer P 1 which is connected to the inverting input I of the operational amplifier OP. The potentiometer P 1 is further connected in series with the collector-emitter path of a switching transistor T 3. The base B 3 of the latter transistor is connected to a timing RC member consisting of resistor R 10, R 11 and capacitor C 5. The timing member is dimensioned such that after the switching on the power supply, a negative potential on the base B 3 of transistor T 3 rises slowly depending on the time constant of the RC member. As a consequence, at the moment of turning on the power the transistor T 3 is not conductive and the entire supply voltage is applied to the inverting input I of the operational amplifier OP. The supply voltage represents a maximum nominal reference value which cannot be exceeded by the detected actual load value. Accordingly, a momentary increase of the motor current during the starting phase does not produce any disconnection by the comparison circuit. Only after a certain period of time depending on the time constant of the RC member R 10, R 11 and C 5, the potential on base electrode B 3 of transistor T 3 reaches a predetermined negative value, the transistor T 3 switches on and a second nominal reference value adjusted by the voltage divider R 16 and P1 is applied to the inverting input I of the comparator. In this fashion the maximum reference voltage value for starting operational phase of the motor is automatically changed to a second nominal reference value corresponding to normal operation of the motor.

Hence, after the switchover of transistor T 3, the comparison circuit operates with a referenc voltage set for the normal operation of the motor and the monitoring circuit safeguards the motor M against overload. In the case when the actual value on the noniverting input N of the operational amplifier exceeds the second nominal reference value, a negative potential is produced at the output A of the operational amplifier OP. The negative output voltage is applied via resistor R 15 to the base terminal B 1 of transistor T 1 which lowers the firing pulses of a diac DC to such an extent that the latter does no longer trigger the triac TC arranged in the control circuit of the electric motor M. The triac TC becomes blocked and interrupts the power supply to the electric motor M and stops the latter.

Simultaneously the negative signal from the output A of the operational amplifier OP is applied via resistor R 17 to the base terminal B 4 of a transistor T 4 so that the latter is switched on. Due to the switchover of transistor T 4, the nominal reference voltage at the comparison circuit is brought to zero. As a result, the entire monitoring circuit is brought in a self-retaining condition inasmuch as zero reference voltage does not permit any start.

At the same time, the transistor T 2 is switched on by the output signal from the operational amplifier applied to its base terminal B 2 and discharges the timing capacitor C 5 so that the RC member be ready for restarting operation.

In order to restart the motor, it is necessary to disconnect the entire monitoring circuit from the power supply and only then it can be restarted.

The beforementioned decoupling diode D 3 prevents the nominal value signals from reaching via impedances of inputs N and I of the operational amplifier the integrating capacitor C 3 and thus prevents any interference with the generation of the actual value signal.

In a modification of the monitoring circuit of this invention there is a possibility to connect parallel to transistor T 4 or to its base electrode B 4 a temperature dependent resistor minus $\phi$ which is mounted in the space of the electromotor M and connects the wiper arm of potentiometer P 1 to ground as indicated by dashed lines in the FIGURE. The purpose of this connection is to influence the second nominal reference signal in response to heating up of the electric motor.

From the above description it will be recognized that the nominal value range for the load monitoring circuit of this invention is adjustable from zero to a maximum value given by the supply voltage and particular nominal reference voltages corresponding to different operational conditions of the electric motor are automatically adjusted in the manner resembling a preset program so as to reliably supervise the load of the motor and disconnect the same in the case of an overload.

It will be understood that each of the elements described above, or two or more together, may also find a useful application in other types of constructions differing from the types described above.

While the invention has been illustrated and described as embodied in a specific example of a load monitoring circuit for electric motors having stator windings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A load monitoring circuit for monitoring different operational conditions of an electric motor having a stator winding, comprising a measuring resistor connected in series with the stator winding to produce an actual load value signal; a variable reference voltage source; a comparison circuit having one input coupled to said measuring resistor, a second input coupled to said variable reference voltage source and an output; means for successively varying the adjustment of the reference voltage source for automatically applying to the second input of the comparison circuit at least three consecutive nominal reference values corresponding to different operational conditions of the electric motor, namely to a maximum nominal reference value corresponding to the starting phase of the motor, a standard nominal reference value corresponding to normal operation of the motor and zero nominal reference voltage value corresponding to an overload, said comparison circuit includes an operational amplifier having a noninverting input coupled to said measuring resistor, an inverting input coupled to said variable reference voltage source, and an output, said variable reference voltage source including a voltage divider connected to a power supply for said electric motor and being series connected with a first switching transistor controlled by a timing circuit in response to the starting current of the motor so as to apply during the starting phase a maximum nominal reference value to the comparison circuit and upon completion of the starting process to apply a standard nominal reference value corresponding to normal operational conditions of the motor; and a second transistor connected to the inverting input of the operational amplifier and having its base coupled to the output of the opertional amplifier so as to adjust the nominal reference voltage to a zero value when an overload is detected by the comparison circuit.

2. A load monitoring circuit as defined in claim 1, wherein said timing member is an RC member connected to the base of the first switching transistor; and further including a third transistor connected parallel to said RC member and having its base coupled to the output of said operational amplifier to discharge the capacitor of the timing member when the nominal reference voltage value is set to zero.

3. A load monitoring circuit as defined in claim 1, further comprising a decoupling member connected between said measuring resistor and the noninverting input of the operational amplifier to prevent coupling between the variable source of reference voltage and the measuring resistor.

4. A load monitoring circuit as defined in claim 1, further comprising a temperature dependent resistor mounted on said electric motor and connected between the inverting input of the operational amplifier and ground.

5. A load monitoring circuit as defined in claim 1, further comprising a temperature dependent resistor mounted on said electric motor and electrically connected in a voltage divider between a power supply for the motor, the stepping point of said voltage divider being connected via a diode to the base of the second transistor.

6. A load monitoring circuit as defined in claim 1, wherein said electric motor includes controllable electronic switching means including a fourth transistor whose base is coupled to the output of said operational amplifier to stop via said electronic control means said motor when an overload is detected by the comparison circuit.

* * * * *